(12) United States Patent
Stojanowski

(10) Patent No.: US 6,853,298 B1
(45) Date of Patent: Feb. 8, 2005

(54) SEAT BELT ALARM

(76) Inventor: Thomas Stojanowski, 97 Delafield Pl., Staten Island, NY (US) 10310

( * ) Notice: Subject to any disclaimer, the term of this patent is extended or adjusted under 35 U.S.C. 154(b) by 3 days.

(21) Appl. No.: 10/394,099

(22) Filed: Mar. 21, 2003

(51) Int. Cl.⁷ ................................................ B60Q 1/00
(52) U.S. Cl. .............................. 340/457.1; 340/384.1; 340/457; 180/268; 200/16.58 B
(58) Field of Search ............................ 340/384.1, 457, 340/457.1; 180/268; 200/16.58 B

(56) References Cited

U.S. PATENT DOCUMENTS

| | | | |
|---|---|---|---|
| 5,406,252 A | 4/1995 | Dear | 340/457.1 |
| 5,596,312 A | 1/1997 | Fowler et al. | 340/457.1 |
| 5,944,135 A | 8/1999 | Blackburn et al. | 180/268 |
| 6,002,325 A | * 12/1999 | Conaway | 340/384.1 |
| 6,175,304 B1 | 1/2001 | Becker | 340/457.1 |
| 6,339,371 B1 | 1/2002 | Baggelaar et al. | 340/457.1 |
| 6,351,210 B1 | 2/2002 | Stewart | 340/457.1 |

* cited by examiner

Primary Examiner—Daryl C. Pope
(74) Attorney, Agent, or Firm—Goldstein Law Offices, P.C.

(57) ABSTRACT

A seat belt alarm, for use with an existing seat belt having a tongue having a tongue flange extending laterally outward, and a buckle having a buckle housing, a front face having a slot for accepting the tongue and locking the tongue therein. The seat belt alarm has an L-shaped housing that selectively attaches beneath the buckle housing and extends alongside the buckle housing. When the L-shaped housing is so positioned, a plunger extends forwardly alongside the buckle housing so that when the tongue is within the slot the tongue flange keeps the plunger inward. If the seat belt is suddenly released and the tongue flange moves away from the front face, a switch in cooperation with the plunger triggers an audible warning.

6 Claims, 5 Drawing Sheets

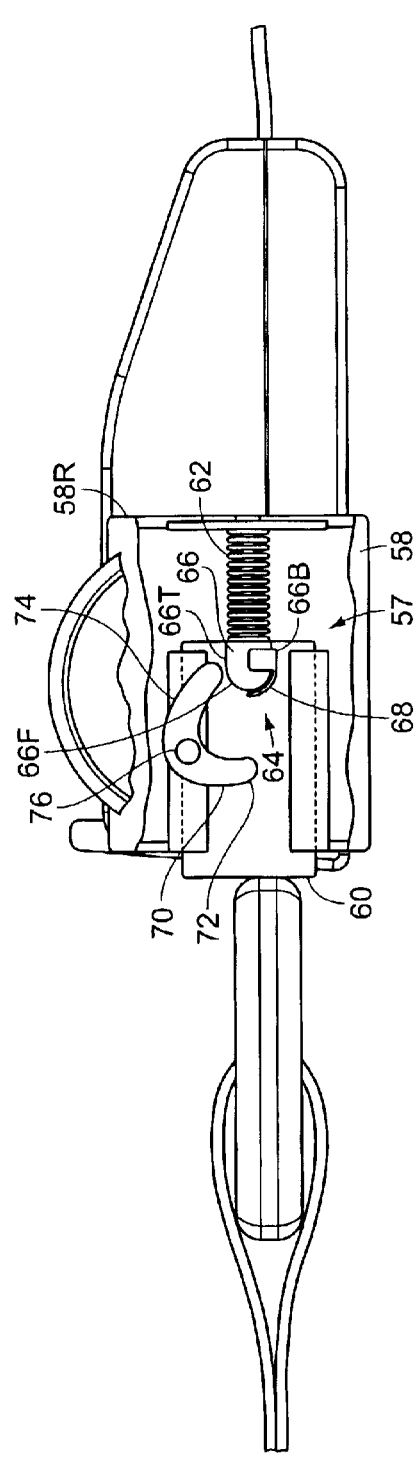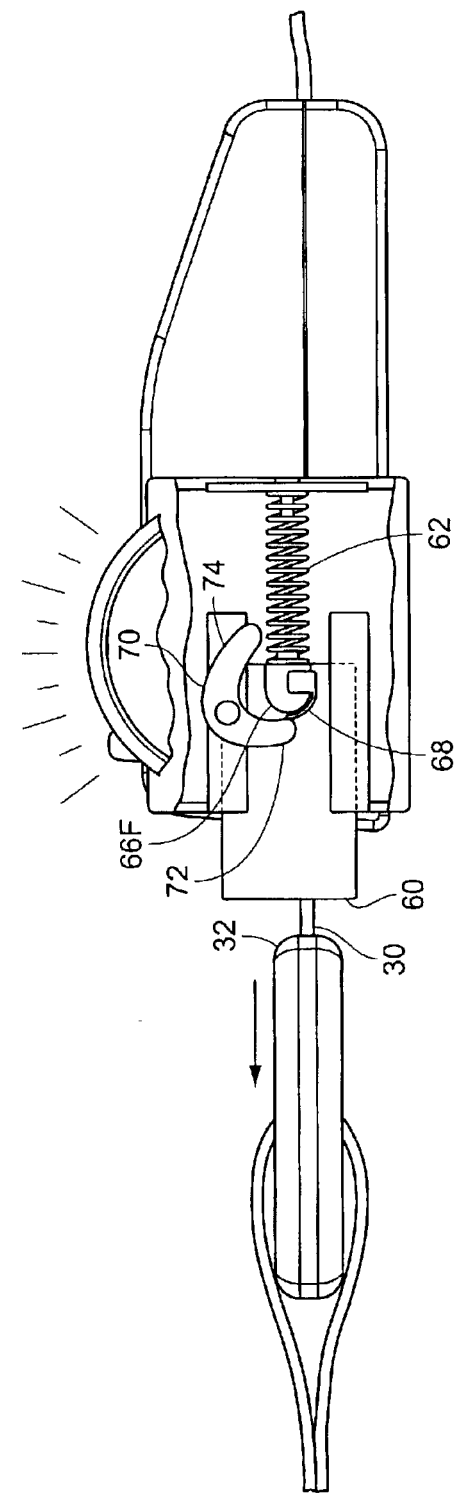
FIG. 4
FIG. 5

SEAT BELT ALARM

BACKGROUND OF THE INVENTION

The invention relates to a seat belt alarm. More particularly, the invention relates to a system that warns a parent when the child has released the seat belt.

Highway safety statistics comparing accident victims who were wearing seat belts to those who were not are hard to ignore. In particular, it is quite clear that wearing a seat belt is a simple step that could easily save the life of a passenger. Accordingly, most adults wear seat belts.

Seat belt usage is particularly important for children. For this reason, it is in most respects mandatory for children to wear their seat belt when traveling in an automobile. Unfortunately, children typically do not like wearing a seat belt. It prevents them from following their natural, child impulses, and constrains their movements. As a result, it is common that a child will release his/her seat belt while the vehicle is in motion. The parents, however, are often unaware that their child is no longer restrained, and might suffer significant injury or worse if there was an accident.

For this reason, some have proposed alarms that seek to notify a parent that the child has released the seat belt.

For example, U.S. Pat. No. 5,944,135 to Blackburn et al., U.S. Pat. No. 6,002,325 to Conaway, and U.S. Pat. No. 6,175,304 to Becker each disclose a system which is incorporated into the seat belt buckle which detects the presence or absence of the seat belt tongue therein. These references propose improved seat belt devices that can be incorporated into newly manufactured cars. Unfortunately, these references will not work with existing seat belt systems.

In this regard, U.S. Pat. No. 5,596,312 to Fowler et al., and U.S. Pat. No. 6,351,210 to Stewart both disclose systems which have a slot for accepting the tongue of the existing seat belt and locking the tongue therein, and then have an auxiliary tongue which is to be used with the existing buckle, for producing an alarm when the auxiliary tongue is released. These devices, however, are unnecessarily complex, and can be easily defeated by a clever child by simply unlocking the tongue of the existing belt from the slot.

U.S. Pat. No. 6,339,371 to Baggelaar et al. discloses a self contained, buckle attachable and actuated alarm device, which attaches beneath the seat belt buckle, and has a metal plate which is trapped between the seat belt tongue and the buckle, so that when the tongue is released, the plate will fall away and release a switch to trigger an alarm. Once again, Baggelaar et al. unnecessarily complicates the usage of the seat belt, and requires a plate that is easily lost when the seat belt is released.

While these units may be suitable for the particular purpose employed, or for general use, they would not be as suitable for the purposes of the present invention as disclosed hereafter.

SUMMARY OF THE INVENTION

It is an object of the invention to produce a seat belt alarm that effectively warns a parent when the child has unexpectedly released his/her seat belt. Accordingly, the device is configured to sound an alarm when the seat belt is suddenly released.

It is another object of the invention to provide a seat belt alarm that is adaptable to existing seat belt systems. Accordingly, the device is self-contained, and attaches to existing seat belt buckles.

It is yet another object of the invention to provide a seat belt alarm that is integrated within a one-piece device. Accordingly, the alarm has an L-shaped housing including a flange which adheres beneath the buckle and a switch which extends alongside the buckle to which the alarm housing is attached, so as to be responsive to the presence of the seat belt tongue flange, and to react upon the sudden absence of the seat belt tongue flange, indicating that the seat belt has been suddenly released.

It is a further object of the invention to employ a switch that triggers an audible warning upon the sudden release of the plunger by making a momentary contact with the outward movement of the plunger. The warning continues for a predetermined period.

The invention is a seat belt alarm, for use with an existing seat belt having a tongue having a tongue flange extending laterally outward, and a buckle having a buckle housing, a front face having a slot for accepting the tongue and locking the tongue therein. The seat belt alarm has an L-shaped housing that selectively attaches beneath the buckle housing and extends alongside the buckle housing. When the L-shaped housing is so positioned, a plunger extends forwardly alongside the buckle housing so that when the tongue is within the slot the tongue flange keeps the plunger inward. If the seat belt is suddenly released and the tongue flange moves away from the front face, a switch in cooperation with the plunger triggers an audible warning.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 4 is a side elevational view, with parts broken away, illustrating the switch in an open circuited condition as the plunger is in the retracted position because the tongue flange is pressing against the plunger.

FIG. 5 is a side elevational view, with parts broken away, wherein the seat belt has been released, releasing the tongue, and thereby extending the plunger, the plunger contact makes a momentary electrical connection with the camming contact.

DETAILED DESCRIPTION OF THE PREFERRED EMBODIMENTS

Figure 1:
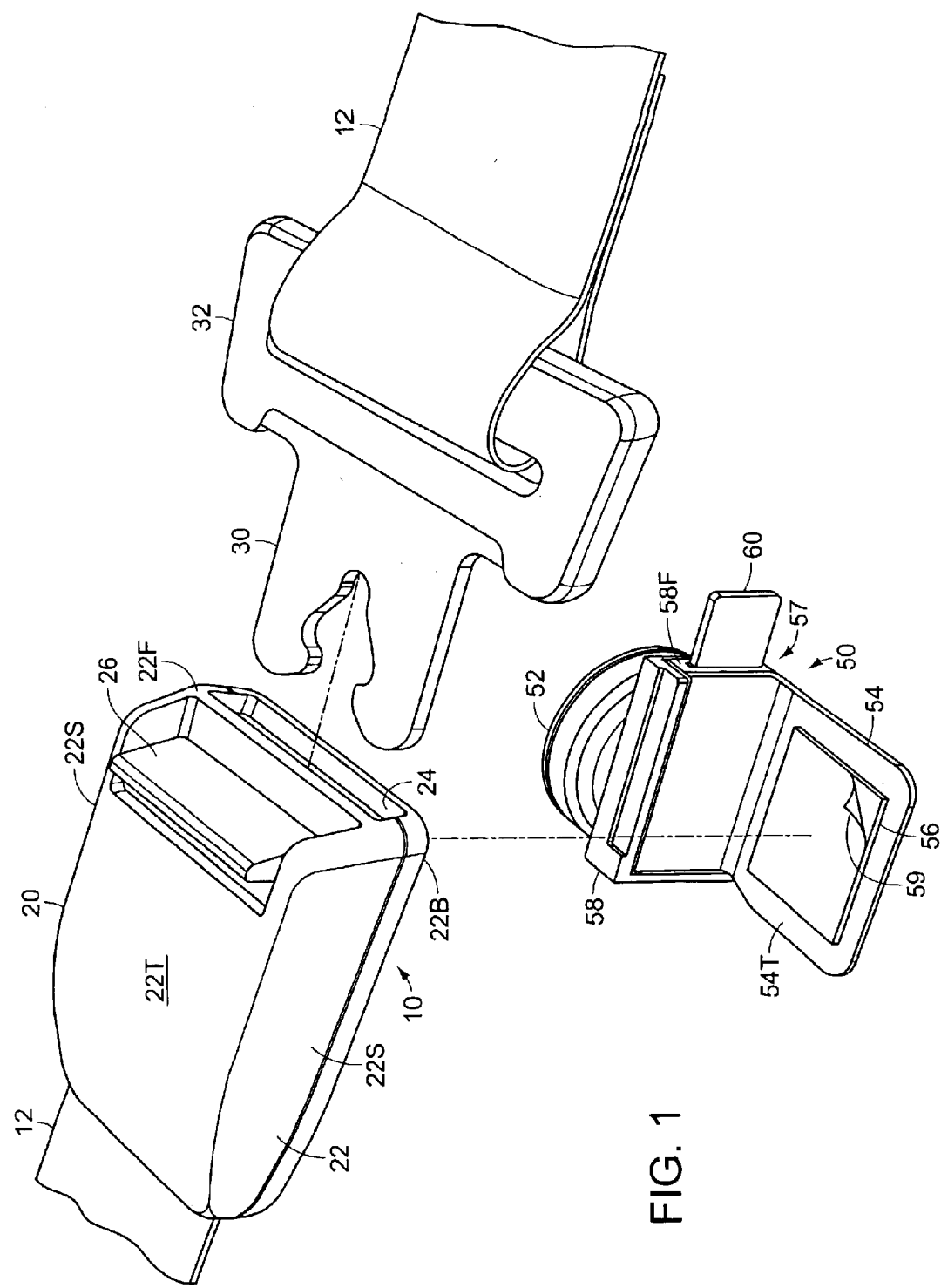
FIG. 1 is an assembly view, illustrating the invention, and its installation to a seat belt buckle, for use in conjunction with the seat belt tongue associated with the seat belt buckle.

FIG. 1 illustrates a seat belt assembly 10, comprising a buckle 20 and a tongue 30. The seat belt assembly 10 of course includes an actual seat belt 12, which is bisected such that one portion is permanently attached to the buckle 20, and the other portion is permanently attached to the tongue 30. The buckle 20 has a housing 22, including a front face 22F, a top 22T, a bottom 22B, and a pair of sides 22S. The housing 22 has a slot 24 that is accessed at the front face 22F for accommodating the tongue 30, and locking the tongue when fully inserted therein. The buckle 20 further has a release button 26 for releasing the tongue 30 and allowing it to be removed from the slot 24 by pressing the release button 26. The tongue 30 has a tongue flange 32 that extends laterally from the tongue 30, such that when the tongue 30 is engaged within the slot 24, the tongue flange 32 extends laterally beyond the sides 22S of the buckle. The tongue flange 32 facilitates safe handling of the tongue 30 and allows the belt 12 attached thereto to be wider than the tongue 30. Accordingly, this feature is typical, and probably standard, among conventional seat belt assemblies 10 in common usage in modern domestic and foreign automobiles, and is key to the functionality of the present invention, as will be described in detail hereinafter.

FIG. 1 also illustrates a seat belt alarm 50 having a switch housing 58, an alarm housing 52 attached to the switch housing 58, and a bottom plate 54 which extends at a substantially right angle from the switch housing 58. The switch housing 58 incorporates a switch 57, including a plunger 60. The switch housing 58 has a front 58F from which the plunger 60 extends. The bottom plate 54 and switch housing 58 together form a one-piece, L-shaped device. In particular, the bottom plate 54 has a top surface 54T with an adhesive pad 56 mounted thereon. Prior to installation, the adhesive pad 56 has a backing strip 59 present thereon to prevent the adhesive pad 56 from inadvertently adhering to objects prior to installation of the invention. To install the invention, the backing strip 59 is peeled from the adhesive pad 56, the switch housing front 58F is aligned with the buckle housing front face 22F and the adhesive pad is adhered to the buckle housing bottom 22B such that the alarm housing 52 extends along one of the sides 22S of the buckle housing 22, and the plunger 60 projects forwardly beyond the buckle housing front face 22F.

Figure 2:
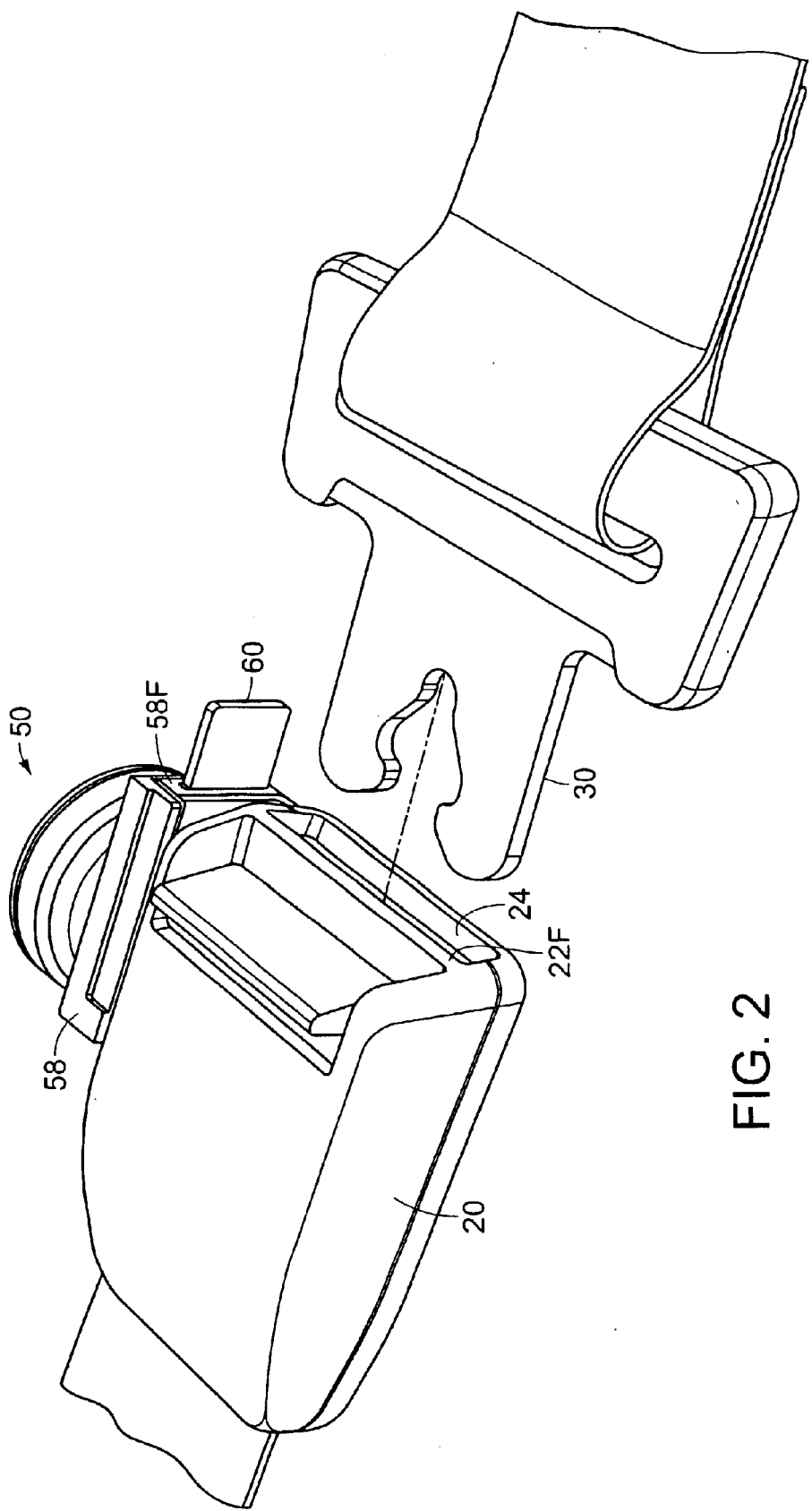
FIG. 2 is a diagrammatic perspective view, illustrating the invention installed upon a seat belt buckle, wherein the seat belt tongue is about to be inserted into the seat belt buckle.
Figure 3:
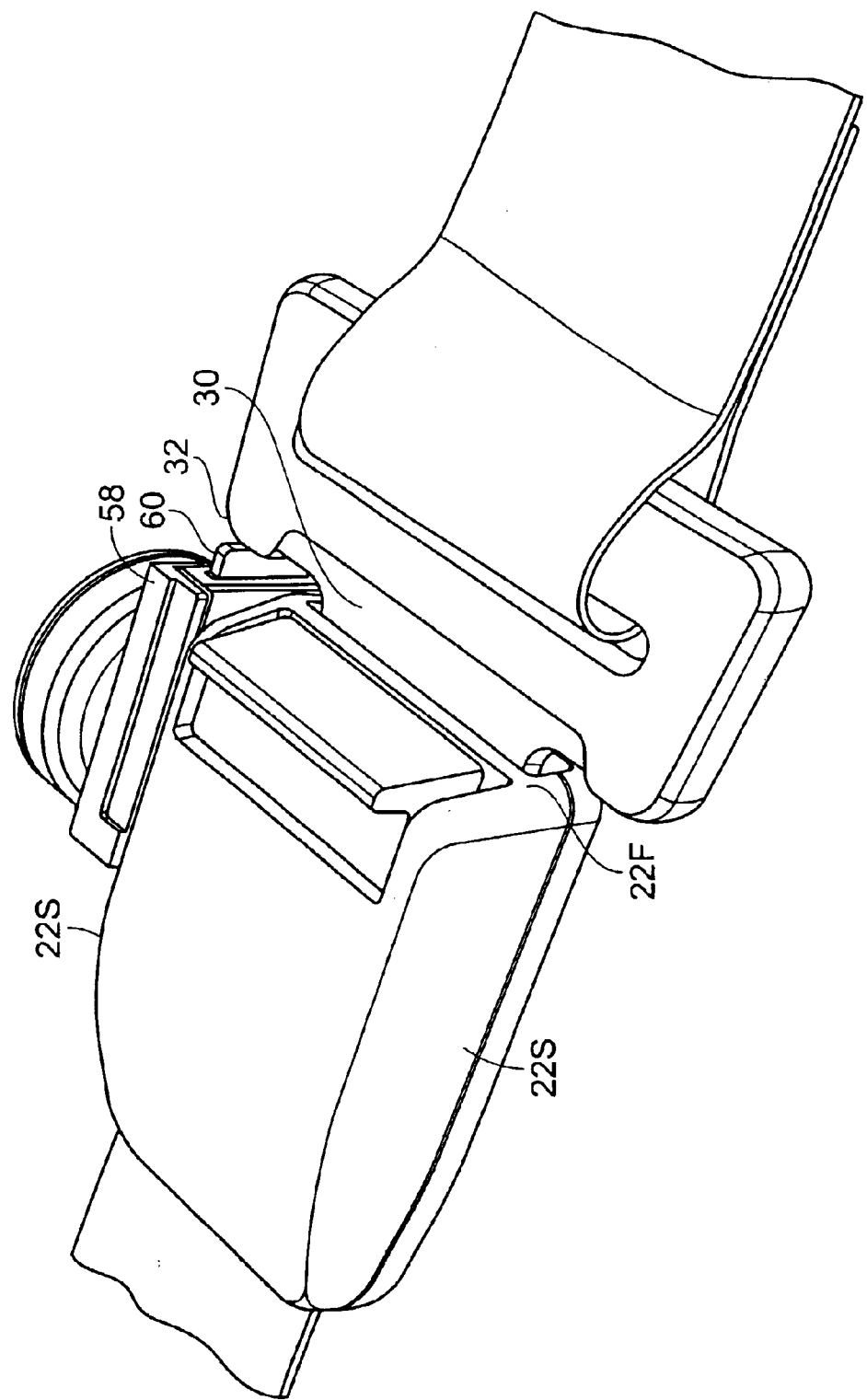
FIG. 3 is a diagrammatic perspective view, illustrating the seat belt tongue engaged with the buckle, wherein the tongue flange is holding the plunger of the present invention in its retracted position.

Referring now to FIG. 2, the seat belt alarm 50 is indeed attached to the buckle 20, wherein the front 58F of the switch housing 58 is aligned (flush) with the front face 22F of the buckle housing 22. The plunger 60 is fully extended, as no external force is acting thereupon. Also illustrated, the tongue 30 is about to be engaged with the slot 24. When the tongue 30 is fully inserted into the slot 24, the tongue 'clicks' and locks into place—as with most or all conventional seat belt assemblies 10. In addition, as illustrated in FIG. 3, the tongue flange 32 pushes (retracts) the plunger 60 substantially into the switch housing 58, as the seat belt flange substantially extends laterally beyond the sides 22S of the buckle housing 22 at the front face 22F thereof. As long as the seat belt tongue 30 remains engaged with the slot 24, the plunger 60 will remain fully within the switch housing 58.

Figure 7:
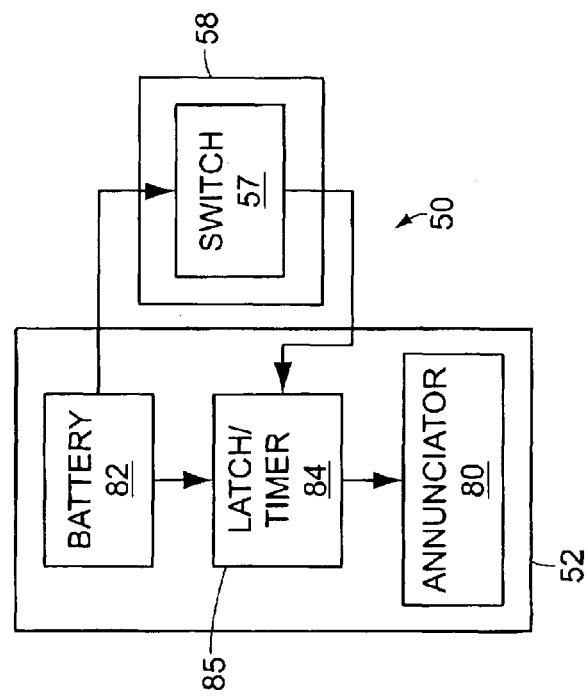
FIG. 7 is a block diagram, illustrating functional interconnection of components of the invention.

Now that the structure has been adequately described, the manner of operation of the present invention 50 is now described with reference to FIG. 7, as well as FIGS. 2 and 3. In particular, within the alarm housing 52 adjacent to the switch 57 is an annunciator 80, capable of generating the audible warning signal. A battery 82 supplies power to a latch/timer unit 84 and to the switch 57. The latch/timer unit 84 has a trigger input 85. In response to power being applied to the trigger input 85, the annunciator 80 is activated/enabled to provide an audible warning to a parent. The latch/timer unit 84 will maintain such warning for a predetermined interval—perhaps fifteen to sixty seconds. Accordingly to FIG. 7, it is apparent that the triggering of the latch/timer unit 84 and the warning signal subsequently generated occurs in response to an electrical connection provided by the switch 57.

Figure 6:
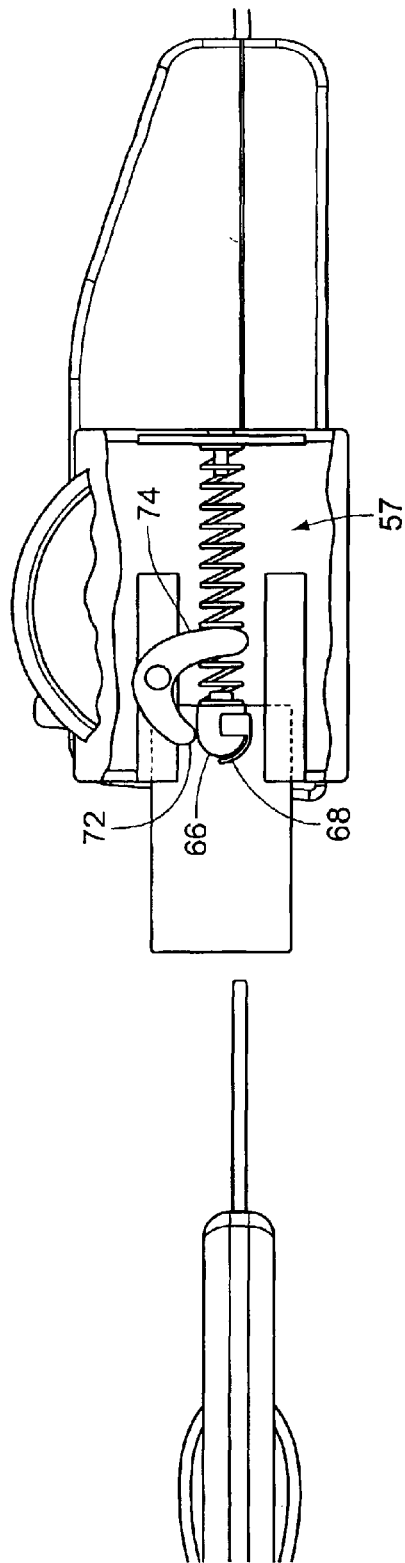
FIG. 6 is a side elevational view, with parts broken away, wherein the plunger is fully extended, such that as the plunger contact moved past the camming contact it moved the camming contact into a position such that it will not make an electrical connection with the plunger contact when the plunger is once again retracted.

Thus, in furtherance of the goals of the present invention, and in a manner described in the discussion of FIG. 4 through 6 hereinafter, the switch 57 is configured so that is will provide a momentary electrical connection between the battery 82 and trigger input 85 to trigger the latch/timer unit 84 when the plunger 60 is suddenly extended, but does not create any such electrical connection when the plunger 60 is fully extended, fully retracted, or being retracted. Accordingly, the annunciator 80 will only be activated when the seat belt is suddenly released. Accordingly, when the seat belt tongue 30 is inserted into the slot 24, the plunger is fully depressed (retracted) by the tongue flange 32 pressing against said plunger 60. When a child presses the release button 26, the tongue 30 is released from the slot 24 and the tongue flange 32 naturally moves away from the buckle front face 22F of the buckle housing such that it no longer presses the plunger 60 inward. Accordingly, under spring biasing, the plunger 60 extends outward from the switch housing 58, close circuiting the switch and triggering the alarm and the sounding of an audible warning signal.

FIG. 4 illustrates the switch 57 with parts of the switch housing 58 broken away. The switch housing 58 has a rear 58R, and a spring 62 biased between the rear 58R and the plunger 60. The plunger has a plunger contact assembly 64, which includes an electrically insulative body 66, and an electrically conductive plunger contact 68. The insulative body 66 has a convex forward portion 66F, a substantially flat and horizontal top 66T, and a substantially flat and horizontal bottom 66B. The top 66T and bottom 66B of the insulative body 66 are substantially parallel to each other and to the direction of motion of the plunger. The plunger contact 68 is located on the forward portion 66F of the insulative body, near the bottom 66B.

The switch 57 also includes a movable contact 70 that is electrically conductive and is substantially boomerang shaped, having a short leg 72 and a long leg 74. The movable contact 70 is pivotally mounted adjacent to the plunger 60 at a movable contact pivot point 76 that is above the top 66T of the insulative body 66. The short leg 72 of the movable contact 72 is located forward of the movable contact pivot point 76 and the long leg 74 is located rearward thereof. The movable contact 70 selectively makes physical contact with the plunger contact assembly 64 as the plunger is extended and withdrawn. The switch 57 is configured so that contact between the movable contact 70 and the plunger contact 68 will close circuit the switch 57.

The movable contact 70 is substantially 'boomerang' shaped—except that the long leg 74 is longer than the short leg 72. In particular, the geometry of the movable contact 70 is such that when the plunger 60 is being retracted the top 66T of the insulative body 66 touches the long leg 74 and pushes said long leg 74 upward to pivot the short leg downward so that it is in the path of the plunger contact 68. Accordingly, referring to FIG. 5, when the tongue 30 is suddenly released from the buckle 20, the tongue flange 32 releases the plunger 60, such that the spring 62 expels the plunger 60 outward. While moving outward with the plunger 60, the forward portion 66F of the insulative body 66, and thus the plunger contact 68 thereon touches the short leg 72 of the movable contact 70 and thereby makes a momentary electrical connection with the movable contact 70, triggering the alarm. Then, as the plunger 60 continues outward, the convex forward portion 66F of the insulative body 66 immediately above the plunger contact 68 pushes against the short leg 72, pivoting the long leg 74 downward as seen in FIG. 6. Accordingly, when the plunger 60 is once again pressed inward, the short leg 72 will not make contact with the plunger contact 68, and the insulative body 66 will strike the long leg 74, once again pivoting the short leg 72 downward after the forward portion 66F (and plunger contact 68 thereon) is already rearward of the short leg 72. Accordingly, the switch 57 operates such that that no electrical connection is made during the inward motion (retraction) of the plunger 60. Upon the sudden expulsion (extension) of the plunger 60, however, momentary electrical contact will once again occur between the movable contact 70 and the plunger contact 68 to trigger the alarm.

By way of equivalent variation of the structure of the switch 57 described immediately above, it should be appreciated that only the short leg 72 need be electrically conductive. In addition, if the long leg 74 is electrically insulative, then the insulative body 66 is less important as the plunger contact could then safely contact the long leg 74 without close circuiting the switch.

In conclusion, herein is presented a system for providing a simple alarm device that may be readily attached to existing seat belt assemblies to provide an audible warning when the seat belt is suddenly released. The invention is illustrated by example in the foregoing description and in the appended drawing figures. Such is illustrative only of the numerous variations possible of the inventive concept. Such variations are contemplated as being a part of the present invention.

What is claimed is:

1. A seat belt alarm, for use with an existing seat belt having a tongue and a buckle which are mated to connect the seat belt, the tongue having a tongue flange extending laterally outward, the buckle having a buckle housing having a top, bottom, a pair of sides, and a front face having a slot for receiving the tongue and locking the tongue therein such that when the tongue is inserted into the slot the tongue flanges extending laterally beyond the buckle housing sides, comprising:

a bottom plate, adapted for adhering to the bottom of the buckle; and a switch housing, extending substantially perpendicular to the bottom plate, so that when the bottom plate is attached to the bottom of the buckle the switch housing extends along one of the sides of the buckle housing, the switch housing containing a switch, the switch housing having a front and having a plunger extending forwardly therefrom, the plunger capable of retracting substantially fully into said switch housing, yet biased to extend forwardly therefrom, such that when the front of the switch housing is positioned substantially flush with the front face of the buckle housing, the switch is responsive to the positioning of the tongue within the slot wherein the tongue flange selectively presses the plunger to retract said plunger into the switch housing when the tongue is within the buckle housing slot, and selectively allows the plunger to extend outward when the tongue is released from the slot, the switch has a plunger contact assembly attached to the plunger and a movable contact pivotally mounted within the switch housing at a movable contact pivot point immediately above the plunger contact, the plunger contact assembly having an electrically conductive plunger contact and an insulative body, the movable contact having an electrically conductive short leg positioned forwardly of the movable contact pivot point and a long leg positioned rearwardly of the movable contact pivot point, when the plunger contact assembly moves rearward as the plunger retracts, the insulative body of the plunger contact assembly pushes against the long leg and pivots the long leg downward in front of the plunger contact so that when the plunger contact assembly moves forwardly when the plunger subsequently extends from the switch housing front face, the movable contact makes a momentary electrical connection with the plunger contact to momentarily close circuit the switch, and wherein the alarm housing further containing an annunciator for generating an audible warning signal when the plunger extends outward immediately following the release of tongue from the slot.

2. The seat belt alarm as recited in claim 1, wherein the audible warning signal only sounds for a predetermined period following the extension of the plunger.

3. The seat belt alarm as recited in claim 2, wherein the switch is only momentarily closed circuited during the extension of the plunger, but is otherwise open circuited when the plunger is fully extended, fully retracted, and during the retraction of the plunger.

4. The seat belt alarm as recited in claim 1, wherein the bottom plate and alarm housing are together L-shaped, and wherein the bottom plate has a top surface having an adhesive for adhering to the seat belt buckle housing bottom.

5. The seat belt alarm as recited in claim 4, wherein the audible warning signal only sounds for a predetermined period following the extension of the plunger.

6. The seat belt alarm as recited in claim 5, wherein the switch is only momentarily closed circuited during the extension of the plunger, but is otherwise open circuited when the plunger is fully extended, fully retracted, and during the retraction of the plunger.

* * * * *